March 23, 1926.
H. HELLWEG
FLOOR MAT FOR AUTOMOBILES
Filed Oct. 27, 1921
1,577,526
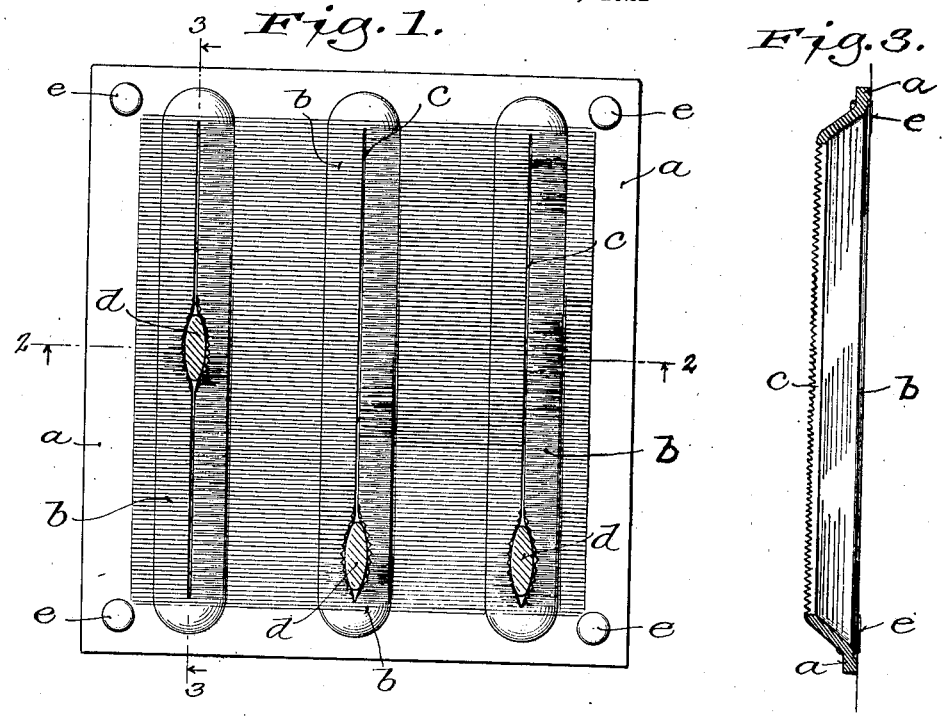
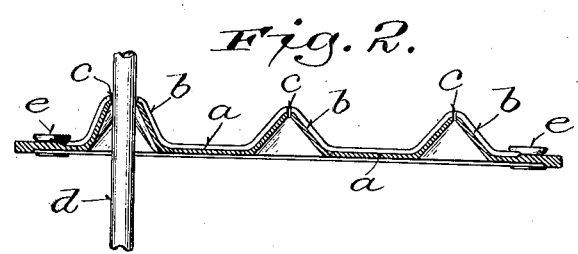
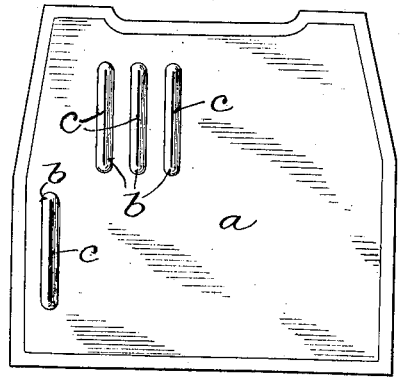
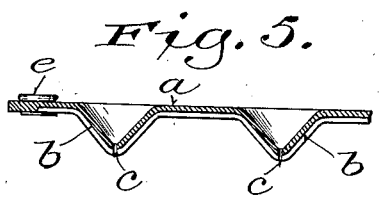
INVENTOR:
Henry Hellweg.
BY
ATTORNEYS.

Patented Mar. 23, 1926.

1,577,526

UNITED STATES PATENT OFFICE.

HENRY HELLWEG, OF MILWAUKEE, WISCONSIN, ASSIGNOR, BY DIRECT AND MESNE ASSIGNMENTS, OF FIFTY-ONE PER CENT TO F. O. RICHEY, OF CLEVELAND, OHIO, AND FORTY-NINE PER CENT TO EDWARD E. RICHARDSON, OF MAUMEE, OHIO.

FLOOR MAT FOR AUTOMOBILES.

Application filed October 27, 1921. Serial No. 510,911.

*To all whom it may concern:*

Be it known that I, HENRY HELLWEG, a citizen of the United States, residing at Milwaukee, in the county of Milwaukee and State of Wisconsin, have invented certain new and useful Improvements in Floor Mats for Automobiles, of which the following is a specification, reference being had to the accompanying drawing, forming a part thereof.

The main objects of this invention are to close the slots or openings in the floor through which the pedal or controlling levers of an automobile pass and thereby prevent the passage of hot or cold air from the hood into the automobile, or the escape of warm air through said openings, without interference with the operation of the pedals, and generally to improve the construction and operation of devices for this purpose.

One of the objects of this invention is to provide closures for said slots with a limited area of contact with the shaft, which is to be reciprocated in the slot.

In the devices heretofore employed, so far as I am aware, the contact with the shaft has been so great as to impede the shaft and often to cause the shaft to pull the flange out of position or out of shape.

It consists in the construction, arrangement and combination of parts as hereinafter particularly described and pointed out in the claims.

In the accompanying drawing like characters designate the same parts in the several figures.

Figure 1 is a plan view of a mat constructed in accordance with the invention and designed for use in connection with three pedal or controlling levers; Fig. 2 is a section of the mat on the line 2—2, Fig. 1; Fig. 3 is a section of the mat on the line 3—3, Fig. 1, without pedals; Fig. 4 is a plan vew on a reduced scale of a full size mat of a modified construction as designed to cover the entire front floor of a Ford car; and Fig. 5 is a partial section similar to Fig. 2 of a modified construction.

Referring to Figs. 1, 2 and 3, showing a small mat embodying the invention as designed for use in connection with a group of three pedal or controlling levers of a Ford car of standard design, the mat consists of a flat flexible sheet $a$, of resilient material such as ruber, formed with three upwardly projecting parallel arches $b$, having normally closed slits $c$, through which the pedal or controlling levers $d$ pass, and in which they are freely movable lengthwise of the slits.

The mat covers and closes the pedal or lever openings in the floor, thereby preventing ingress of hot or cold air through said openings from the hood or engine housing into the car body, as well as the escape of warm air from the car body in cold or cool weather.

The arching of the mat next to the slits $c$, through which the shanks of the pedals or controlling levers pass, forms a more effective closure, enabling the elastic edges of the mat next to the slits to more readily conform to the pedal shanks or levers without obstruction to their movement, and preventing or reducing the abrasion and wear of their edges by the movement of the pedal shanks or levers through the slits.

The arches $b$ may be V-shape, as shown, or any other suitable shape which will have substantially the same effect, and their number and arrangement will obviously be varied according to the number and arrangement of the pedal or controlling levers of automobiles of different makes. The arches may be made to project upwardly, as shown in Fig. 2, or downwardly, as shown in Fig. 5.

The mat is provided with suitable fastenings used in connection with rugs or mats, for holding it in place, with the slitted arches $b$ over and in proper alignment with the pedal or lever openings in the floor.

The mat is preferably corrugated transversely to the arches, as shown in Figs. 1, 2, 3 and 5, the corrugations giving stability to the walls of the arches and causing them to close snugly around the pedal shanks or levers and against each other along the slits $c$ away from the pedals or levers.

It will be seen that the arches $b$ constitute supports for the ends of the flanges and hold the flanges in position. The flanges are prevented from engaging the lever over too great an area. In the embodiment of my invention shown, the engagement of the flanges with the shaft is limited to the edge of the flanges so that neither will the shafts be retarded nor the flanges displaced through a too firm gripping of the shaft by the flange.

I have illustrated this particular embodiment of my invention and the details thereof for the purpose of illustrating the invention and not that I desire to be limited thereto. Both the embodiment and the details thereof may be varied without departing from the spirit of the invention.

I claim:

1. A mat of the character described formed from a sheet of rubber, a rib formed upon the upper face and having its ends terminating at points spaced from the edge of the mat, and said rib having a longitudinal slit terminating near the ends of the rib.

2. In a mat for an automobile floor board provided with a slot through which a shaft is to reciprocate, the combination of a base provided with a slot through which the shaft may reciprocate, a pair of flanges, one connected to the base at each side of the slot and extending diagonally over the slot and slitted at the crown so that the edges of the flanges only engage the shaft and supports at the ends of the flanges to aid in preventing the collapse or displacement of the flanges.

3. As an article of manufacture a molded mat of the character described comprising a body portion, a set of parallel spaced ribs upon the upper face of the body portion, said body portion having a set of channels formed in the lower face directly opposite the ribs, said ribs having openings communicating with said channels, and said ribs having longitudinal slits communicating with the ends of the openings and terminating adjacent the ends of the ribs, and said body portion having openings to receive fastening elements.

4. In a mat for an automobile foot board, the combination of a base provided with a slot, through which an automobile pedal or brake lever may reciprocate, flanges of flexible material connected with the base of said mat projecting from the two sides of the slot and extending obliquely athwart the slot, the edges of the flexible flanges being turned towards and facing each other and being so close together as to leave a very slight opening, whereby the passage of air and dirt through the slot is effectively opposed by the integral flanges and supports at the ends of said slots for said flanges.

5. A floor mat for automobiles consisting of a flexible sheet of resilient material formed with an arch having closed ends and a normally closed slit at the apex, and corrugated transversely to the slit.

6. In a mat for an automobile foot board, the combination of a base provided with a slot, through which an automobile pedal or brake lever may reciprocate, flanges of flexible material connected with the base of the mat and projecting from the two sides of the slot and extending athwart the slot, the free edges of the flanges facing each other and extending substantially perpendicular to the base and supports at the ends of said slots for the flanges.

7. In a mat for an automobile foot board, the combination of a base provided with a slot, through which an automobile pedal or brake lever may reciprocate, flanges of flexible material integral with the base of said mat projecting from the two sides of the slot and extending upwardly from the mat and over the slot, the said flanges being normally out of engagement with each other, the edges of the flexible flanges being so close together as to leave a very slight opening, whereby the passage of air and dirt through the slot is effectively opposed by the integral flanges.

8. A lever guard of the type indicated made up as a single construction of rubber, comprising a body portion having a slot therethrough, through which a lever may project and pass, and flanges at opposite sides of said slots integral with the guard said flanges being normally out of engagement with each other, and having their free edges very close together, said flanges adapted to hug the lever for the purpose set forth.

9. In a mat for an automobile foot board, the combination of a base provided with a slot, through which an automobile pedal or brake lever may reciprocate, flanges of flexible material integral with the base of said mat and projecting from the two sides of the slot and extending upwardly and obliquely from the base and over the slot, said flanges being normally out of engagement with each other, the free edges of the flexible flanges being very nearly but not in contact, whereby the passage of air and dirt through the slot is effectively opposed and the passage of the pedal or lever shaft is permitted.

10. In a device of the class described, the combination of a base provided with a slot for the passage of an automobile pedal shaft or lever, a pair of flexible flanges, one connected to each of the edges of said slot and extending from said base obliquely over said slot to oppose the passage of air, dust and the like through said slot and to permit the passage of the brake lever, or the like, and means to support said flanges in their normal positions.

In witness whereof I hereto affix my signature.

HENRY HELLWEG,